United States Patent
Jaeger et al.

(10) Patent No.: US 11,966,727 B2
(45) Date of Patent: *Apr. 23, 2024

(54) LOAD MODULE COMPILER

(71) Applicant: LzLabs GmbH, Wallisellen (CH)

(72) Inventors: Jan Jaeger, Ruschlikon (CH); Thomas D. Grieve, Romsey (GB)

(73) Assignee: LzLabs GmbH, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,990

(22) Filed: May 26, 2022

(65) Prior Publication Data
US 2023/0100192 A1    Mar. 30, 2023

Related U.S. Application Data

(63) Continuation of application No. 16/920,998, filed on Jul. 6, 2020, now Pat. No. 11,354,103, which is a continuation of application No. 16/121,170, filed on Sep. 4, 2018, now Pat. No. 10,713,024, which is a continuation of application No. PCT/IB2016/051415, filed on Mar. 11, 2016.

(51) Int. Cl.
*G06F 8/53* (2018.01)
*G06F 8/41* (2018.01)
*G06F 8/52* (2018.01)
*G06F 8/76* (2018.01)

(52) U.S. Cl.
CPC ............... *G06F 8/53* (2013.01); *G06F 8/447* (2013.01); *G06F 8/47* (2013.01); *G06F 8/52* (2013.01); *G06F 8/76* (2013.01)

(58) Field of Classification Search
None
See application file for complete search history.

(56) References Cited

U.S. PATENT DOCUMENTS

| | | |
|---|---|---|
| 3,559,183 A | 1/1971 | Sussenguth |
| 4,713,748 A | 12/1987 | Magar et al. |
| 5,276,891 A | 1/1994 | Patel |
| 5,301,302 A | 4/1994 | Blackard et al. |
| 5,526,296 A | 6/1996 | Nakahara et al. |

(Continued)

FOREIGN PATENT DOCUMENTS

| | | |
|---|---|---|
| EP | 0843256 A2 | 5/1998 |
| EP | 1316882 A2 | 6/2003 |

(Continued)

OTHER PUBLICATIONS

Zhang, X., et al., VBIW: Optimizing Indirect Branch in Dynamic Binary Translation, IEEE 10th International Conference on High Performance Computing and Communications, 2013, pp. 1456-1462, [retrieved on Mar. 6, 2020], Retrieved from the Internet :<URL:http://ieeexplore.ieee.org/>.*

(Continued)

*Primary Examiner* — Geoffrey R St Leger
(74) *Attorney, Agent, or Firm* — Seed IP Law Group LLP

(57) ABSTRACT

The disclosure invention provides a method for executing a program compiled for a source architecture on a machine having a different target architecture, a non-transitory computer readable medium configured to store instructions for performing such a method, and a system for performing such a method.

17 Claims, 5 Drawing Sheets

(56) References Cited

U.S. PATENT DOCUMENTS

| | | | |
|---|---|---|---|
| 5,574,873 | A | 11/1996 | Davidian |
| 5,598,560 | A | 1/1997 | Benson |
| 5,724,590 | A | 3/1998 | Goettelmann et al. |
| 5,751,982 | A | 5/1998 | Morley |
| 5,768,593 | A | 6/1998 | Walters et al. |
| 5,781,457 | A | 7/1998 | Cohen et al. |
| 5,790,867 | A | 8/1998 | Schmidt et al. |
| 5,815,686 | A | 9/1998 | Earl et al. |
| 5,842,017 | A | 11/1998 | Hookway et al. |
| 5,875,336 | A | 2/1999 | Dickol et al. |
| 5,889,980 | A | 3/1999 | Smith, Jr. |
| 5,896,522 | A | 4/1999 | Ward et al. |
| 6,000,028 | A | 12/1999 | Chernoff et al. |
| 6,052,530 | A | 4/2000 | Buzbee et al. |
| 6,071,317 | A | 6/2000 | Nagel |
| 6,091,897 | A * | 7/2000 | Yates ............. G06F 9/45516 717/138 |
| 6,351,844 | B1 | 2/2002 | Bala |
| 6,609,194 | B1 | 8/2003 | Henry et al. |
| 6,615,300 | B1 | 9/2003 | Banning et al. |
| 6,662,361 | B1 * | 12/2003 | Jackson ................ G06F 8/52 717/136 |
| 6,785,801 | B2 | 8/2004 | Duesterwald et al. |
| 6,810,517 | B2 | 10/2004 | Bond et al. |
| 6,820,252 | B2 | 11/2004 | Sakamoto et al. |
| 6,907,519 | B2 | 6/2005 | Desoli |
| 6,910,206 | B1 | 6/2005 | Nevill |
| 7,058,932 | B1 | 6/2006 | Jennings et al. |
| 7,107,584 | B2 | 9/2006 | Bond et al. |
| 7,111,096 | B1 | 9/2006 | Banning et al. |
| 7,203,933 | B2 | 4/2007 | Souloglou et al. |
| 7,236,995 | B2 | 6/2007 | Hinds |
| 7,269,825 | B1 | 9/2007 | Adcock |
| 7,529,789 | B2 | 5/2009 | Hansen et al. |
| 7,574,346 | B2 | 8/2009 | Bond et al. |
| 7,584,461 | B2 | 9/2009 | Plum |
| 7,720,898 | B2 | 5/2010 | Driker et al. |
| 7,735,072 | B1 | 6/2010 | Altman et al. |
| 7,765,539 | B1 | 7/2010 | Elliott et al. |
| 8,134,566 | B1 | 3/2012 | Brown et al. |
| 8,423,976 | B2 | 4/2013 | Zwirner et al. |
| 8,713,289 | B2 | 4/2014 | Copeland et al. |
| 8,732,678 | B2 | 5/2014 | Nanja et al. |
| 8,839,191 | B2 | 9/2014 | Ota et al. |
| 9,235,420 | B2 | 1/2016 | Cavanna et al. |
| 9,335,982 | B1 | 5/2016 | Morgan |
| 2001/0042173 | A1 | 11/2001 | Bala et al. |
| 2002/0032718 | A1 | 3/2002 | Yates et al. |
| 2002/0059268 | A1 | 5/2002 | Babaian et al. |
| 2002/0066081 | A1 | 5/2002 | Duesterwald et al. |
| 2002/0095661 | A1 | 7/2002 | Angel et al. |
| 2003/0033593 | A1 | 2/2003 | Duesterwald et al. |
| 2003/0110478 | A1 | 6/2003 | Duesterwald et al. |
| 2003/0149963 | A1 | 8/2003 | Sandham et al. |
| 2004/0128331 | A1 | 7/2004 | Hinds et al. |
| 2004/0158822 | A1 | 8/2004 | Sandham et al. |
| 2005/0050524 | A1 | 3/2005 | Booker et al. |
| 2005/0097535 | A1 | 5/2005 | Plum |
| 2005/0246507 | A1 | 11/2005 | Busaba et al. |
| 2008/0120496 | A1 | 5/2008 | Bradford et al. |
| 2009/0089041 | A1 | 4/2009 | Irving et al. |
| 2009/0106744 | A1 * | 4/2009 | Li ............................ G06F 8/447 717/151 |
| 2010/0257221 | A1 | 10/2010 | Jiang |
| 2010/0274755 | A1 | 10/2010 | Stewart |
| 2010/0293545 | A1 | 11/2010 | Su et al. |
| 2013/0086596 | A1 | 4/2013 | Ota et al. |

FOREIGN PATENT DOCUMENTS

| | | |
|---|---|---|
| WO | 0010081 A2 | 2/2000 |
| WO | 02052409 A2 | 7/2002 |
| WO | 2009092180 A1 | 7/2009 |
| WO | 2018197928 A1 | 11/2018 |

OTHER PUBLICATIONS

Aho et al., "Compilers: Principles, Techniques, & Tools," Pearson Education, Inc., Second Edition, pp. 119, 418-421, 2007. (9 pages).

Alsup, "Motorola's 88000 Family Architecture," IEEE Micro 10(3):48-66, Jun. 1990. (19 pages).

Amrehn et al., "International Technical Support Organization: Linux for S/390," International Business Machines Corporation, First Edition (version 2), Sep. 2000. (554 pages).

Amrehn et al., "International Technical Support Organization: Linux for S/390," International Business Machines Corporation, First Edition, Sep. 2000. (574 pages).

Anonymous, "Technique to get the dependency information between Java EE and Cics Cobol programs in an integrated application server which can run both Java EE and Cics Cobol applications," IP.com Journal, IP.com No. IPCOM00231547D, Oct. 2013. (7 pages).

Application Note, "TMS320C25 digital signal processor," Microprocessors and Microsystems, 12(9): 505-512, Nov. 1988. (8 pages).

Austin, "A User's and Hacker's Guide to theSimpleScalar Architectural Research Tool Set," Intel MicroComputer Research Labs, Jan. 1997. (92 pages).

Austin, "sim-eio: SimpleScalar/Alpha Tool Set version 3.0 of September—sim: simulation started @ Wed Aug. 26, 17:02:38 1998," SimpleScalar, LLC, 1998. (212 pages).

Austin, "sim-eio: SimpleScalar/Alpha Tool Set version 3.0 of September—sim: simulation started @ Wed Aug. 26, 17:02:01 1998," SimpleScalar, LLC, 1998. (138 pages).

Austin, "sim-eio: SimpleScalar/Alpha Tool Set version 3.0 of September—sim: simulation started @ Wed Aug. 26, 17:03:04 1998," SimpleScalar, LLC, 1998. (175 pages).

Austin, "SimpleScalar (™) Tool Suite—alpha.c—Alpha ISA definition routines," SimpleScalar, LLC, 1994-2003. (314 pages).

Austin, "SimpleScalar (™) Tool Suite—bitmap.h—bit manipulation macros," SimpleScalar, LLC, 1994-2003. (175 pages).

Austin, "SimpleScalar (™) Tool Suite—config.h—SimpleScaler Pisa Isa default configuration," SimpleScalar, LLC, 1994-2003. (37 pages).

Austin, "SimpleScalar (™) Tool Suite—host.h—host-dependent definitions and interfaces," SimpleScalar, LLC, 1994-2003. (140 pages).

Austin, "SimpleScalar (™) Tool Suite—pisa.c—SimpleScaler portable ISA (pisa) definition routines," SimpleScalar, LLC, 1994-2003. (272 pages).

Austin, "SimpleScalar Hacker's Guide (for tool set release 2.0)," SimpleScalar LLC Tutorial. (92 pages) Jun. 27, 2007 (wayback machine copy).

Bala et al., "Dynamo: A Transparent Dynamic Optimization System," *ACM Sigplan Notices* 46(4), Feb. 2003. (12 pages).

Bala et al., "Transparent Dynamic Optimization," HP Laboratories Cambridge, HPL-1999-77, Jun. 1999. (18 pages).

Bala et al., "Transparent Dynamic Optimization: The Design and Implementation of Dynamo," HP Laboratories Cambridge, HPL-1999-78, Jun. 1999. (102 pages).

Barham et al., "Xen and the Art of Virtualization," *SOSP'03 ACM Symposium on Operating Systems Principles*, Bolton Landing, New York, Oct. 19-22, 2003, pp. 164-177. (14 pages).

Bellard, "QEMU, a Fast and Portable Dynamic Translator," FREENIX Track: 2005 USENIX Annual Technical Conference, Anaheim, CA, Apr. 10-15, 2005, pp. 41-46. (6 pages).

Bruening et al., "An Infrastructure for Adaptive Dynamic Optimization," International Symposium on Code Generation and Optimization, 2003. CGO 2003, San Francisco, CA, Mar. 23-26, 2003, pp. 265-275. (11 pages).

Bull S.A., "Database Products: Bull DPS 7000," IQS Reference Manual, vol. 2, 47 A2 78UR Rev04, Mar. 1999. (416 pages).

Burger et al., "The SimpleScalar Tool Set, Version 2.0," *Computer Architecture News* 25(3): 13-25, Jun. 1997. (14 pages).

Calder et al., "Branch Prediction Architectures for 64-bit Address Space," Technical Report CU-CS-690-93, *Department of Computer Science*, University of Colorado, Nov. 1993. (21 pages).

Calder et al., "The Precomputed-Branch architecture: Efficient branches with compiler support," *Journal of Systems Architecture*

(56) References Cited

OTHER PUBLICATIONS

45:651-679, Mar. 1999. (29 pages).
Chen et al., "Storage-Efficient Representation of Decimal Data," *Communications of the ACM*, 18(1):49-52, Jan. 1975. (4 pages).
Chernoff et al., "FX!32 A Profile-Directed Binary Translator," *IEEE Micro* 18:56-64, March/Apr. 1998. (9 pages).
Cmelik et al., "Shade: A Fast Instruction-Set Simulator for Execution Profiling," *ACM Sigmetrics Performance Evaluation Review* 22(1): 128-137, May 1994. (10 pages).
Compaq Computer Corporation, "Alpha Architecture Reference Manual," Fourth Edition, Jan. 2002. (983 pages).
Control Data Corporation, "Control Data Star-100 Computer," Hardware Reference Manual, Publication No. 60256000, Revision 09, Dec. 15, 1975. (444 pages).
Cowlishaw et al., "A Decimal Floating-Point Specification," Proceedings 15th IEEE Symposium on Computer Arithmetic. ARITH-15 2001, Vail, CO, Jun. 11-13, 2001, pp. 147-154. (8 pages).
Cowlishaw, "Decimal Arithmetic Encoding Strawman 1," Draft—Version 0.72, Jul. 5, 2002. (23 pages).
Cowlishaw, "Decimal Arithmetic Encoding Strawman 4d," Draft—Version 0.96, Feb. 21, 2003. (18 pages).
Cowlishaw, "Decimal Floating-Point: Algorism for Computers," Proceedings of the 16th IEEE Symposium on Computer Arithmetic, Santiago de Compostela, Spain, Jun. 15-18, 2003. (8 pages).
Cowlishaw, "Standard Decimal Arithmetic Extended Specification," Draft—Version 0.30, Aug. 9, 2000. (23 pages).
Cowlishaw, "Standard Decimal Arithmetic Specification," Draft—Version 0.69, Aug. 9, 2000. (29 pages).
Cowlishaw, "The design of the REXX language," *IBM Systems Journal* 23(4):326-335, 1984. (10 pages).
Desoli et al., "DELI: A New Run-Time Control Point," Proceedings of the 35 th Annual IEEE/ACM International Symposium on Microarchitecture (MICRO-35), Istanbul, Turkey, Nov. 18-22, 2002. (12 pages).
Driesen et al., "The Direct Cost of Virtual Function Calls in C++," OOPSLA '96: Proceedings of the 11th ACM SIGPLAN conference on Object-oriented programming, systems, languages, and applications, pp. 306-323, Oct. 1996. (18 pages).
Duesterwald, "Design and Engineering of a Dynamic Binary Optimizer," *Proceedings of the IEEE* 93(2): 436-448, Feb. 2005. (13 pages).
Durand et al., "The Evolution of Mainframe Transactional Processing Through Containerization and the Cloud," LzLabs White Paper, Jan. 2018. (6 pages).
Dyck, "Linux on S/390 or zSeries: Getting Started," Technical Support, Sep. 2001. (5 pages).
Ebcioglu et al., "A Java ILP Machine Based on Fast Dynamic Compilation," IBM T.J. Watson Research Center, 1997. (13 pages).
Ebcioglu et al., "DAISY: Dynamic Compilation for 100% Architectural Compatibility," *ACM SIGARCH Computer Architecture News* 25(2):26-37, May 1997. (12 pages).
Education Services of Digital Equipment Corporation, "KE44-A CISP Technical Manual," EK-KE44A-TM-001, 1981. (150 pages).
Ehrman, "High Level Assembler Release 4: New/Updated Features and Functions: SHARE 102 (Feb. 2004), Session 8164," IBM Documentation, Feb. 2004. (18 pages).
Eichenberger et al., "Optimizing Compiler for a CELL Processor," 14th International Conference on Parallel Architectures and Compilation Techniques, St. Louis, MO, USA, Sep. 17-21, 2005. (12 pages).
Emmerik et al., "Using a Decompiler for Real-World Source Recovery," 11th Working Conference on Reverse Engineering, Nov. 2004. (10 pages).
Erle et al., "Potential Speedup Using Decimal Floating-Point Hardware," Conference Record of the Thirty-Sixth Asilomar Conference on Signals, Systems and Computers, Pacific Grove, CA, USA, Nov. 3-6, 2002, pp. 1073-1077.
Examination Report No. 1 for Australian Application No. 2016396782 dated Mar. 16, 2021. (5 pages).

Falby, "The Java Native Interface on z/OS," z/Journal, Dec. 2010. (4 pages).
Faraboschi et al., "Lx: A Technology Platform for Customizable VLIW Embedded Processing," *ACM SIGARCH Computer Architecture News* 28(2):203-213, May 2000. (11 pages).
Frantz et al., "The Texas Instruments TMS320C25 Digital Signal Microcomputer," *IEEE Micro* 6:10-28, Dec. 1986. (19 pages).
Gnu C Library, "libc6-dev-2.0.7.19981211-stdio.h," Free Software Foundation, Inc. 1991-1998, retrieved Aug. 24, 2023. (5 pages).
Gnu C Library, "libc6-dev-2.36-9+deb12ul-stdio.h," Free Software Foundation, Inc. 1991-2022, retrieved Aug. 24, 2023. (14 pages).
Gochman et al., "Intel® CentrinoTM Mobile Technology: The Intel® Pentium® M Processor: Microarchitecture and Performance," Intel Technology Journal 7(2):21-36, May 2003. (18 pages).
Granlund et al., "Eliminating Branches using a Superoptimizer and the Gnu C Compiler," *ACM SIGPLAN Notices* 27(7):341-352, Jul. 1992. (12 pages).
Greiner, "New z/Architecture Instructions that Can Save You Time & Effort," IBM PowerPoint presentation, August 2, 2010 (54 pages).
Gross et al., "Measurement and Evaluation of the MIPS Architecture and Processor," *ACM Transactions on Computer Systems* 6(3):229-257, Aug. 1988. (29 pages).
Gschwind, "Method and apparatus for determining branch addresses in programs generated by binary translation," Research Disclosures, No. 416, Jul. 1998. (10 pages).
Hazelwood et al., "A Dynamic Binary Instrumentation Engine for the ARM Architecture," *CASES'06*, Seoul, Korea, Oct. 23-25, 2006. (10 pages).
Heinrich, "MIPS R4000 Microprocessor User's Manual," Second Edition, 1994. (754 pages).
Heller et al., "Millicode in an IBM zSeries processor," *IBM Journal of Research and Development* 48(3/4): 425-434, May/Jul. 2004. (11 pages).
Hennessy et al., "Computer Architecture: A Quantitative Approach," Fourth Edition, Morgan Kaufman Publishers Inc., Sep. 2006. (705 pages).
Hercules Version 2: Frequently-Asked Questions, retrieved on Aug. 19, 2023 from URL=https://web.archive.org/web/20010413214232/http://www.conmicro.cx/hercules/hercfaq.html#software, last updated May 2001. (36 pages).
Hercules Version 2: Installation and Operation, retrieved on Aug. 19, 2023 from URL=https://web.archive.org/web/20010417035545/http://www.conmicro.cx/hercules/hercinst.html, last updated Feb. 2001. (32 pages).
Hercules Version 3: Frequently-Asked Questions, retrieved on Aug. 19, 2023 from URL=https://web.archive.org/web/20060212045355/http://www.conmicro.cx/hercules/hercfaq.html, Revision 1.58, last updated Dec. 2005. (24 pages).
Hercules-2.13-1.i686.rpm.objdump.txt, <s370_add_logical>; <s370_subtract logical register>. (10 pages).
Hercules-2.13-1.i686.rpm.objdump.txt, <s370_add_logical_register>. (1 page).
Hercules-2.13-1.i686.rpm.objdump.txt, <s390_add_logical>:, 080bb2c0 <s390_subtract logical register>. (10 pages).
Hercules-2.13-1.i686.rpm.objdump.txt, <z900_add_logical>; <z900 subtract_logical register>. (12 pages).
Hercules-2.13-1.i686.rpm.objdump.txt, retrieved Aug. 23, 2023 at 19:02:27. (6938 pages).
Hercules-2.13-1.i686.rpm.objdump.txt, retrieved Aug. 23, 2023, at 22:09:09. (8128 pages).
Hercules: Frequently-Asked Questions, retrieved on Aug. 19, 2023, from URL=https://web.archive.org/web/20010126112800/http://www.conmicro.cx/hercules/hercfaq.html, last updated Jan. 2001. (9 pages).
Hercules: Installation and Operation, retrieved Aug. 23, 2023 from URL=https://web.archive.org/web/20010124095200/http://www.conmicro.cx/hercules/hercinst.html, last updated Jan. 2001. (4 pages).
Hiser et al., "Evaluating Indirect Branch Handling Mechanisms in Software Dynamic Translation Systems," International Symposium on Code Generation and Optimization (CGO'07), San Jose, CA, USA, Mar. 11-14, 2007. (13 pages).

(56) References Cited

OTHER PUBLICATIONS

Holler, "Optimization for a Superscalar Out-of-Order Machine," Proceedings of the 29th Annual IEEE/ACM International Symposium on Microarchitecture, Paris, France, Dec. 2-4, 1996, pp. 336-348. (13 pages).

Hookway et al., "Digital FX!32 Running 32-Bit x86 Applications on Alpha NT," Proceedings IEEE Compcon 97, Digest of Papers, San Jose, CA, USA, Feb. 23- 26, 1997, pp. 37-42. (6 pages).

HP, "PA-RISC 1.1 Architecture and Instruction Set Reference Manual," Third Edition, Feb. 1994. (424 pages).

Hu et al., "Efficient Binary Translation System with Low Hardware Cost," 2009 IEEE International Conference on Computer Design, Lake Tahoe, CA, USA, Oct. 4-7, 2009, pp. 305-312. (8 pages).

Hu et al., "GODSON-3: a Scalable Multicore Risc Processor With X86 Emulation," *IEEE Micro* 29:17-29, March/Apr. 2009. (14 pages).

IBM Systems Reference Library—IBM System/360, Disk Operating System, System Generation and Maintenance, IBM Documentation, Eighth Edition, Apr. 1969. (386 pages).

IBM Systems Reference Library, "IBM System/360 Principles of Operation," Form A22-6821-0, File No. S360-01. (168 pages) 1964.

IBM Systems Reference Library, "IBM System/360 Principles of Operation," Ninth Edition, GA22-6821-8, Nov. 1970. (216 pages).

IBM, "360 Introductory Programming: 360 PGM," Student Workbook, Revision 1, Aug. 25, 1970. (247 pages).

IBM, "Control Program-67/Cambridge Monitor System (CP-67/CMS) Version 3 Program No. 360D-05.2.005 User's Guide," First Edition, Oct. 1970. (608 pages).

IBM, "Control Program-67/Cambridge Monitor System (CP-67/CMS) Version 3.2 Program No. 360D-05.2.005 CP-67 Program Logic Manual," Third Edition, May 1973. (300 pages).

IBM, "Enterprise COBOL for z/OS: Programming Guide, Version 4 Release 1," First Edition, Dec. 2007. (906 pages).

IBM, "Field Engineering Education Student Self-Study Course," System/360 Introductory Programming Book 3—Fixed Point Binary Operations, R23-2957-1, 1964-1965. (121 pages).

IBM, "IBM System/360 Operating System MVT Supervisor," OS Release 21.7, Program No. 360S-CI-535, Eighth Edition, May 1973. (812 pages).

IBM, "IBM Systems Reference Library—IBM OS—Linkage Editor and Loader, Program Nos. 360S-ED-510 360S-ED-521 360S-LD-547," IBM documentation, File No. S360- 31, Order No. GC28-6538-9, Tenth Edition, Jan. 1972. (250 pages).

IBM, "IBM Virtual Machine Facility Edit Guide—Preliminary Publication," Mar. 28, 1972, File No. S370-2-0. (480 pages).

IBM, "IBM Virtual Machine Facility/370 Quick Guide for Users," Reference Summary GX20-1926-1, Second Edition, Apr. 1973. (78 pages).

IBM, "IBM Virtual Machine Facility/370: Operating Systems in a Virtual Machine," File No. S370-34, Order No. GC20-1821-3, Fourth Edition, Mar. 1979. (170 pages).

IBM, "IBM Virtual Machine Facility/370: System Logic and Problem Determination Guide vol. 3," Release 5 PLC 1, First Edition, Dec. 1977. (89 pages).

IBM, "IBM Virtual Machine Facility/370: System Programmer's Guide," File No. S370-36, Order No. GC20-1807-7, Eighth Edition, Mar. 1979. (430 pages).

IBM, "Immediate Access Storage, Indexing Registers, Automatic Floating-Decimal Arithmetic, and Magnetic Tape," 650 Data Processing System Bulletin, G24-5003-0, Jun. 1959. (47 pages).

IBM, "Nasa Standard Spacecraft Computer (NSSC-II): Principles of Operation," Initial release Dec. 15, 1977, errata added May 15, 1979. (184 pages).

IBM, "PowerPC User Instruction Set Architecture: Book 1, Version 2.01," International Business Machines Corporation, Sep. 2003. (219 pages).

IBM, "Synergistic Processor Unit Instruction Set Architecture: Version 1.0," Aug. 1, 2005. (257 pages).

IBM, "System/36 Concepts and Programmer's Guide," Program Nos. 5727-SS1, 5727-SS6, Sixth Edition, Jun. 1987. (608 pages).

IBM, "System/360 Model 40 Comprehensive Introduction," SY22-2840-2, Sixth Edition, Apr. 1970. (66 pages).

IBM, "Virtual Machine / Personal Computer User's Guide," First Edition, Dec. 1984. (522 pages).

IBM, "Virtual Machine / System Product CP Command Reference for General Users," Release 4, SC19-6211-3, Fourth Edition, Dec. 1984. (308 pages).

IBM, Enterprise Systems Architecture/390, Principles of Operation, SA22-7201-08, Ninth Edition, Jun. 2003. (1028 pages).

IBM, General Decimal Arithmetic, retrieved Jan. 25, 2023 from URL=https://web.archive.org/web/20031209143745/http://www2.hursley.IBM.com:80/decimal/, 2003. (4 pages).

IBM, IBM: Mrprcins, retrieved from URL=https://www.vm.IBM.com/pubs/mon720/MRPRCINS.HTML, Aug. 24, 2023, last updated Aug. 9, 2020. (7 pages).

IBM, System/370 Extended Architecture, Interpretive Execution, Publication No. SA22-7095-0, File No. S370-01, First Edition, Jan. 1984. (32 pages).

IBM, Technical Newsletter No. 10, Applied Science Division, 34-6711-0-5M-P, Oct. 1955. (284 pages).

IBM, z/ Architecture, Principles of Operation, SA22-7832-00, First Edition, Dec. 2000. (1026 pages).

IBM, z/ Architecture, Principles of Operation, SA22-7832-01, Second Edition, Oct. 2001. (1024 pages).

IBM, z/ Architecture, Principles of Operation, SA22-7832-01, Third Edition, Jun. 2003. (1092 pages).

IBM, z/Architecture, Preliminary Decimal-Floating-Point Architecture, Nov. 2006. (60 pages).

Informix, "Chapter 2: Data Types," Informix Guide to SQL: Reference, Version 9.1, retrieved from URL=https://www.oninit.com/manual/informix/english/docs/visionary/infoshelf/sqlr/02.toc.html, downloaded Dec. 20, 2022. (21 pages).

Intel Corporation Annual Report 1985, Order No. 231722. (35 pages).

Intel, "IA-32 Intel® Architecture Software Developer's Manual," vol. 2: Instruction Set Reference, 2002. (954 pages).

Intel, "Intel® Itanium® Architecture Software Developer's Manual: Revision 2.3," vol. 1: Application Architecture, 245317, May 2010. (244 pages).

International Preliminary Report and Written Opinion, dated May 14, 2021, for International Patent Application No. PCT/IB2019/059149. (17 pages).

International Preliminary Report on Patentability for PCT Application No. PCT/IB2016/051415, mailed Sep. 20, 2018. (10 pages).

International Search Report and Written Opinion, dated Apr. 8, 2020, for International Patent Application No. PCT/IB2019/059149. (27 pages).

International Search Report and Written Opinion, mailed Oct. 5, 2016, for International Application No. PCT/IB2016/051415. (4 pages).

Jaeger, "ESAME (z/Architecture) instructions," 2000-2001. (279 pages).

Jaeger, "S/390 System Utilities Main index," retrieved from URL= https://web.archive.org/web/20021102191100/https://www.cbttape.org/~jjaeger/, Nov. 2002. (1 page).

Katevenis, "Reduced Instruction Set Computer Architectures for VLSI," Dissertation Submitted for the degree of Doctor of Philosophy in Engineering, University of California, Berkeley, Apr. 1983. (228 pages).

Kernighan et al., "The C Programming Language," Second Edition, Prentice Hall, 1978-1988. (288 pages).

Kim et al., "Dynamic Binary Translation for Accumulator-Oriented Architectures," International Symposium on Code Generation and Optimization, 2003, CGO 2003, San Francisco, CA, USA, Mar. 23-26, 2003. (11 pages).

Kim et al., "Hardware Support for Control Transfers in Code Caches," Proceedings of 36th Annual IEEE/ACM International Symposium on Microarchitecture, 2003, MICRO-36, San Diego, CA, USA, Dec. 5, 2003. (12 pages).

Kiriansky et al., "Secure Execution Via Program Shepherding," Proceedings of the 11th USENIX Security Symposium, Aug. 2002. (13 pages).

(56) References Cited

OTHER PUBLICATIONS

Lee et al., "Branch Prediction Strategies and Branch Target Buffer Design," *Computer* 17:6-22. Jan. 1984. (17 pages).
Li et al., "Adapting Branch-Target Buffer to Improve the Target Predictability of Java Code," *ACM Transactions on Architecture and Code Optimization* 2(2): 109-130, Jun. 2005. (22 pages).
Magnusson et al., "Efficient Memory Simulation in SIMICS," Proceedings of the 28th Annual Simulation Symposium, Phoenix, Arizona, Apr. 9-13, 1995. (13 pages).
Mahon et al., "Hewlett-Packard Precision Architecture: The Processor," Hewlett-Packard Journal 37(8), Aug. 1986. (45 pages).
Motorola, Inc., "MC88100: RISC Microprocessor User's Manual," Second Edition 1990, 1989, Prentice Hall. (334 pages).
Omron, "SYSMAC CVM1D Duplex System Programmable Controllers: Operation Manual," Revised Aug. 2001. (476 pages).
Optimize Options—Using the GNU Compiler Collection (GCC), retrieved on Aug. 19, 2023, from https://web.archive.org/web/20060629231135/https://gcc.gnu.org/onlinedocs/gcc-3.3.6/gcc/Optimize-Options.html, Jun. 2006. (14 pages).
Osisek et al., "ESA/390 Interpretive-execution architecture, foundation for VM/ESA," IBM Systems Journal 30(1):34-51. 1991. (18 pages).
Perleberg et al., "Branch Target Buffer Design and Optimization," Department of Electrical Engineering and Computer Science, University of California, Berkeley, Technical Report No. UCB/CSD-89-552, Dec. 23, 1989. (34 pages).
Plambeck et al., "Development and attributes of z/Architecture," IBM Journal of Research & Development 46(4/5):367-379, Jul./Sep. 2002. (13 pages).
QEMU Open Source Processor Emulator, retrieved from https://web.archive.org/web/20070827153813/http://fabrice.bellard.free.fr/qemu/about.htm1, last modified Feb. 6, 2007. (12 pages).
QEMU x86 Emulator Reference Documentation, retrieved on Aug. 19, 2023, from file:///D:/LzLabs/AAUS lawsuit/Invalidity Contentions/qemu-0.2/qemu-0.2/qemu-doc.html, document generated May 28, 2003. (7 pages).
Rbowler, hercules-390 / SVN / Commit [r4262], Decimal Floating Point: CUXTR,CUDTR instructions, retrieved from URL=http://sourceforge.net/p/hercules-390/svn/4262/, Jan. 22, 2007. (5 pages).
Ris, "A Unified Decimal Floating-Point Architecture for the Support of High-Level Languages (Extended Abstract)," SIGPLAN Notices, Sep. 1977. (11 pages).
Rogers, "The What and Why of System z Millicode," St. Louis CMG Local Users Group, Jul. 2016, IBM Corporation. (28 pages).
Rogers, "What and Why of System Z Millicode," NaSPA New York City, Oct. 2012, IBM Corporation. (14 pages).
S/390 System Utilities, Instructions not listed in Principles of Operation or your yellow/pink/blue/white reference card, retrieved on Aug. 24, 2023, from https://web.archive.org/web/20021102191100/http://www.cbttape.org:80/~jjaeger/. (1 page).
Schwarz et al., "CMOS floating-point unit for the S/390 Parallel Enterprise Server G4," *IBM J. Res. Develop.*, 41(4/5), Jul./Sep. 1997. (14 pages).
Schwarz et al., "The microarchitecture of the IBM eServer z900 processor," IBM J. Res. & Dev., 46(4/5):381-395, Jul./Sep. 2002. (15 pages).
Schwarz et al., "The S/390 Floating Point Unit Supporting Hex and Binay Architectures," *1999 IEEE*, Apr. 14-16, 1999. (8 pages).
Scott et al., "Overhead Reduction Techniques for Software Dynamic Translation," *Proceedings of the 18th International Parallel and Distributed Processing Symposium (IPDPS'04)*, 2004. (8 pages).
Shen et al., "A Retargetable Static Binary Translator for the ARM Architecture," *ACM Transactions on Architecture and Code Optimization* 11(2): 18, Jun. 2014. (25 pages).
Shustek, "Analysis and Performance of Computer Instruction Sets," Dissertation submitted to the Department of Computer Science of Standford University, Jan. 1978. (397 pages).
SimpleScalar 1994-2003, word list. (980 pages).

SimpleScalar Tools, available as of 2007 from https://web.archive.org/web/20070627232342/http://www.simplescalar.com/tools.html, 1 page.
Simplescalar, main dictionary, 1994-2003. (538 pages).
Simplescalar, README file for the SimpleScalar simulator release 3.0, available from http://www.simplescalar.com in the file simplesim?3v0d.tar.gz, 1994-2003. (242 pages).
Smith et al.,. "Virtual Machines: Versatile Platforms for Systems and Processes," Elsevier Inc., Morgan Kaufmann Publishers, 2005. (51 pages).
Sourceforge, "Kernel Virtual Machine, " retrieved from URL=https://sourceforge.net/projects/kvm/, last updated Dec. 13, 2013. (2 pages).
SPARC International Inc., "The SPARC Architecture Manual: Version 8," Revision SAV080SI9308, 1991. (295 pages).
Sridhar et al., "HDTrans: A Low-Overhead Dynamic Translator," ACM SIGARCH Computer Architecture News 35(1): 135-140, Mar. 2007. (6 pages).
Sridhar et al., "HDTrans: An Open Source, Low-Level Dynamic Instrumentation System," VEE '06: Proceedings of the 2nd international conference on Virtual execution environments, Jun. 14-16, 2006, Ottawa, Ontario, Canada, pp. 175-185, Jun. 2006. (11 pages).
Stallman, "Using the GNU Compiler Collection," last updated Dec. 30, 2002, for GCC version 3.3.1, Free Software Foundation, 2003. (392 pages).
Standard Decimal Arithmetic, retrieved from https://web.archive.org/web/20000831213343/http://www2.hursley.IBM.com/decimal/decimal.htm, on Mar. 25, 2022, 3 pages.
Stern et al., "370/360 Assembler Language Programming," John Wiley & Sons, Inc., 1979. (509 pages).
Stricker, "Tutorial—Java programming with JNI," IBM Developer Tutorials online, retrieved from URL=https://developer.IBM.com/technologies/java/tutorials/j-jni/, Mar. 2002. (21 pages).
Sun Microelectronics, "UltraSPARC™M—IIi: User's Manual," Sun Microsystems Inc., 1997. (552 pages).
Sun Microsystems, "Sun xVM VirtualBox®," User Manual Version 2.0.2, 2004-2008 Sun Microsystems, Inc. (221 pages).
System/390 Instructions Operation Code List, 1995-2001, Last Modified Jan. 14, 2001, retrieved from https://web.archive.org/web/20010224115227/http://tachyonsoft.com:80/inst390o.htm, on Aug. 24, 2023. (17 pages).
Technical Committee on Microprocessors and Microcomputers of the IEEE Computer Society, "IEEE Standard for Binary Floating-Point Arithmetic," IEEE Std 754-1985, Oct. 1985. (20 pages).
Technical Committee on Microprocessors and Microcomputers of the IEEE Computer Society, "IEEE Standard for Floating-Point Arithmetic," IEEE Std 754TM-2008, Revision of IEEE Std 754™-1985, Aug. 29, 2008. (70 pages).
Technical Committee on Microprocessors and Microcomputers of the IEEE Computer Society, "IEEE Standard for Radix-Independent Floating-Point Arithmetic," ANSI/IEEE Std 854-1987, Oct. 1987. (19 pages).
Texas Instruments, "Second-Generation TMS320 User's Guide," Document No. SPRU014, ECN No. 526628, Dec. 1987. (578 pages).
Texas Instruments, "TMS320C2x User's Guide," 1604907-9761 revision C, Jan. 1993. (587 pages).
The Hercules System/370, ESA/390, and z/Architecture Emulator, 2006, retrieved from https://web.archive.org/web/20060201230230/http://www.conmicro.cx:80/hercules/, on Aug. 19, 2023. (21 pages).
Thornton, "Linux Do-It-Yourself: Part VIII—Installing Hercules and Debian Linux for S/390," *Technical Support*, Dec. 2002. (5 pages).
Thornton, "Linux on the System/390," Proceedings of the 4th Annual Linux Showcase & Conference, Atlanta, Georgia, Oct. 10-14, 2000. (10 pages).
Transitive, "QuickTransit Overview," 2004 Transitive Corporation. (2 pages).
Ung et al., "Machine-Adaptable Dynamic Binary Translation," DYNAMO '00: Proceedings of the ACM SIGPLAN workshop on Dynamic and adaptive compilation and optimization, Jan. 2000, pp. 41-51. (11 pages).

(56) References Cited

OTHER PUBLICATIONS

Varian, "VM and the VM Community: Past, Present, and Future," Office of Computing and Information Technology, Princeton University, Apr. 1991. (168 pages).
Virtualbox, "VirtualBox—professional, flexible, open," retrieved from https://web.archive.org/web/20070120174900/http://www.virtualbox.org/wiki/VirtualBox, 2007-2008. (4 pages).
Webb et al., "A high-frequency custom Cmos S/390 microprocessor," *IBM J. Res. Develop.*, 41(4/5):463-473, Jul. / Sep. 1997. (11 pages).
Wikipedia, "IBM 650," archived Dec. 8, 2022, URL=https://en.wikipedia.org/wiki/IBM_650, download date Dec. 20, 2022. (9 pages).
Witchel et al., "Embra: Fast and Flexible Machine Simulation," ACM SIGMETRICS Performance Evaluation Review, 24(1):68-79, May 1996. (12 pages).
Wolontis, "A Complete Floating-Decimal Interpretive System for the IBM 650 Magnetic Drum Calculator," IBM Technical Newsletter No. 11, Mar. 1956. (86 pages).
Xen-Project, "What is Xen?" retrieved from https://github.com/xen-project/xen/releases/tag/3.3.0-branched, Aug. 21, 2008. (7 pages).
Yahoo Groups, "3088's and VMNET," retrieved from https://hercules-390.groups.io/g/yahooarchive/message/3474, Aug. 21, 2023. (17 pages).
Zbiciak, "CP-1610 Instruction Set Simulator," retrieved from spatula-city.org/~im14u2c/intv/jzintv/doc/historic/jzintv/cp_1610.txt, on Apr. 20, 2022. (9 pages).

\* cited by examiner

```
MOD_DATA    (
/* 000010 */    "\x47\xF0\xF0\x28\x00\x00\xC3\xC5\x00\x00\x02\x28\x00\x00\x00\x14"
/* 000020 */    "\x47\xF0\xF0\x01\x98\xCE\xAC\x00\x00\x00\xB6\x00\x00\x00\x00\x00"
                "\x00\x00\x00\x00\x00\x00\x00\x90\xEC\xD0\x0C\x41\x10\xF0\x00\x38"
.
.
/* 001BE0 */    "\x50\xA8\x32\x46\x58\x52\x00\x0C\xD2\x9F\x50\x00\x32\xB2\x98\xEC"
/* 001BF0 */    "\xD0\x0C\x07\xFE" );
```

FIG. 3

```
MOD_RLD4(  0x000018   ,   0x000038   ,   0x000044   ,
           0x000048   , /* 0x00004C */   0x000054   ,   0x0000C6   ,
.
.
           0x0018B6   ,   0x0019EE   );
```

FIG. 4

```
MOD_LBL(&&start, &&lzIndex3, &&lzIndex4, &&lzIndex5,
&&lzIndex6, &&lzIndex7, &&lzIndex8, &&lzIndex9,
.
.
&&lzIndex58, &&lzIndex59, &&lzIndex60, &&lzIndex61,
);
```

FIG. 5

LOAD MODULE COMPILER

CROSS-REFERENCE TO RELATED APPLICATIONS

The present application is a continuation of U.S. patent application Ser. No. 16/121,170 filed Sep. 4, 2018, which is a continuation of PCT International Application No. PCT/IB2016/051415 filed Mar. 11, 2016, the contents of which are incorporated in their entirety herein.

TECHNICAL FIELD

The present invention relates to techniques and systems for executing a program compiled for a source architecture on a machine having a different target architecture.

BACKGROUND

A decompiler is a program that reverses the process of a compiler which translates a computer program written in a high-level, typically human-readable language into a machine language program. In other words, a decompiler takes as input a program written in machine language, and translates that program into an equivalent program written in a higher-level language. A decompiler can be used to create a source code file that may be edited by a programmer and subsequently recompiled, or cross compiled for execution on a platform having a different machine architecture. However, decompilation does not produce source code that is identical to the original source code from which the machine language code or object code was originally generated. In particular, where optimizing compilers have been used to improve executable performance, information is frequently lost which cannot be fully recovered using a decompiler. Additionally, decompiling object code is complicated because it is difficult to separate computer code from data. Nevertheless, decompilation has found applications in algorithm extraction and analysis, in malware detection, and, to a limited degree, for source code recovery for purposes of modifying or translating object code from one environment to another.

A disassembler receives as input an executable program and converts that program into a machine independent assembly code representation. Assembly language typically has a one-to-one correspondence between assembly instructions and underlying machine instructions. A disassembled program can be reassembled by an assembler into an executable program.

In the case of interdependent software programs, translating code from one computer architecture to another typically introduces changes that break interfaces between previously interoperable programs. For example, in the case of call back programs that pass as parameters the addresses of routines or functions to allow a receiving program to invoke a routine in a calling program, translation through decompilation and recompilation to a different target architecture will typically change the addresses, and may change the size of address operands, so as to disrupt the ability of the receiving program to invoke the remote routine.

External references are references within a computer program or routine to some code or data that is not declared within that program or routine. Typically, external references in one program are identifiers that are declared in code that is compiled separately from the first program. In the event that a computer program that uses external references is decompiled and subsequently recompiled on another target architecture, the external references will not operate if the target architecture uses a different addressing scheme than the original architecture. For example, if a program that used external addresses is initially compiled to run on a 32 bit machine, the machine code for that program will use 32 bit addresses. If addresses to program code compiled for such a 32 bit machine are passed to other programs as external references, the receiving program must also be designed to receive and make use of 32 bit addresses. In the event that the calling program is recompiled for a 64 bit machine, the external references will no longer function correctly.

A load module refers to all or part of an executable program, typically in the context of a legacy, mainframe computing environment. A compiler, such as the a Cobol compiler, translates a source code program made up of one or more source code files into object code including one or more machine language program files. These object code files, in some cases together with additional object files, can be linked and assembled into an executable program. Such an executable program is constrained to run only on a processor of a specific architecture and instruction set. Typically, a processor of a given architecture has associated with its architecture an instruction set. Processors having different architectures support different instruction sets, with the result that an executable program including machine instructions of one instruction set will not generally execute on a processor having a different architecture and different corresponding instruction set.

A load module compiler that could receive as input, a compiled legacy load module such as a Cobol load module compiled for a System 390 mainframe, and that could generate as output an executable program that could run on a 64 bit x86 platform while continuing to make external references accessible would enable the migration of mainframe computing jobs to a non-mainframe environment without rewriting and/or recompiling the original Cobol source code.

SUMMARY

The present invention, according to a first embodiment, relates to a computer implemented method for executing a first program compiled for a source architecture on a machine having a target architecture different from the source architecture. The method includes receiving by a processor the first program including first executable code compiled to execute on a source architecture, decompiling by a decompilation module executing on the processor the load module into intermediate computer code formatted according to an intermediate code format, identifying by the decompilation module the set of addresses that are exposed for external reference by a second program compiled to execute on the source architecture, and storing in a computer memory an index of the addresses that are exposed for external reference. The index values correspond to a range of invalid addresses in the target architecture. The method further includes recompiling by a compiler module, the intermediate code into target executable code configured for the target architecture. The compiler module incorporates the index of the addresses into the target executable code. Finally the method includes executing the target executable code on a processor having the different target architecture. Executing generates at least one invalid address and an exception handler translates the invalid address into a valid address using the incorporated index.

According to further embodiments, which may be used in combinations with one another and the first embodiment, the invention also includes a method in which: receiving by a processor a first program is performed by a processor of the source architecture; receiving by a processor the first program is performed by a processor of the target architecture; recompiling by a compiler module is performed on a second processor of the target architecture; intermediate code formatted according to an intermediate code format invokes an input output macro; the compiler module inserts one or more instructions into the target code to determine that a branch target is directed to an invalid address and instructions to replace such invalid address with a valid address at runtime using the incorporated index; the set of addresses that are exposed for external reference are 32-bit addresses and the at least one address according to the target architecture is a 64-bit address; the first program is a relocatable Cobol load module; the intermediate code formatted according to an intermediate code format includes a set of C program macros; the identifying by the decompiler module the set of addresses that are exposed for external reference includes, in a first pass by the decompiler module, examining the syntax of the instructions in the machine code of the first program, determining from the syntax of the instructions that a set of symbols are addresses, and adding the symbols to the index; the identifying by the decompiler module the set of addresses that are exposed for external reference further includes identifying parameters in the machine code including the first program whose calculation indicates that the parameters are addresses within a range of addresses allocated to the first program, and adding the symbols corresponding to each such parameter to the index; the identifying by the decompiler module the set of addresses that are exposed for external reference further includes identifying symbols located in the external symbol directory, and adding the symbols corresponding to such symbols to the index; and the identifying by the decompiler module the set of addresses that are exposed for external reference further includes identifying symbols located in the relocation directory, and adding the symbols corresponding to such symbols to the index.

According to a second embodiment, the invention provides a non-transitory computer readable medium configured to store instructions. The instructions when executed by one or more processors cause the one or more processors to execute a first program compiled for a source architecture on a machine having a target architecture different from the source architecture by performing steps including receiving by a processor the first program including first executable code compiled to execute on a source architecture, decompiling by a decompilation module executing on the processor the load module into intermediate computer code formatted according to an intermediate code format, identifying by the decompilation module the set of addresses that are exposed for external reference by a second program compiled to execute on the source architecture, storing in a computer memory an index of the addresses that are exposed for external reference, wherein the index values correspond to a range of invalid addresses in the target architecture, recompiling by a compiler module, the intermediate code into target executable code configured for the target architecture, wherein the compiler module incorporates the index of the addresses into the target executable code, and executing the target executable code on a processor having the different target architecture. Executing generates at least one invalid address and an exception handler translates the invalid address into a valid address using the incorporated index.

According to further embodiments, which may be used in combinations with one another and the second embodiment, the invention also includes instructions in which, when executed: the intermediate code formatted according to an intermediate code format invokes an input output macro; the compiler module inserts one or more instructions into the target code to determine that a branch target is directed to an invalid address and instructions to replace such invalid address with a valid address at runtime using the incorporated index; the set of addresses that are exposed for external reference are 32-bit addresses and the at least one address according to the target architecture is a 64-bit address; the first program is a relocatable Cobol load module; the intermediate code formatted according to an intermediate code format includes a set of C program macros; identifying by the decompiler module the set of addresses that are exposed for external reference includes, in a first pass by the decompiler module, examining the syntax of the instructions in the machine code of the first program, determining from the syntax of the instructions that a set of symbols are addresses, and adding the symbols to the index; identifying by the decompiler module the set of addresses that are exposed for external reference further includes identifying parameters in the machine code including the first program whose calculation indicates that the parameters are addresses within a range of addresses allocated to the first program, and adding the symbols corresponding to each such parameter to the index; identifying by the decompiler module the set of addresses that are exposed for external reference further includes identifying symbols located in the relocation directory, and adding the symbols corresponding to such symbols to the index. All methods described above may also be used with the non-transitory computer readable medium.

According to a third embodiment, the invention provides a system for executing a first program compiled for a source architecture on a machine having a target architecture different from the source architecture. The system includes a first platform including one or more processors of a source architecture and a decompilation module installed on the first platform and configured to execute on a processor of the one or more processors of the source architecture. The decompilation module is adapted to receive the first program including first executable code compiled to execute on a source architecture, decompile the load module into intermediate computer code formatted according to an intermediate code format, identify the set of addresses that are exposed for external reference by a second program compiled to execute on the source architecture and store in a computer memory an index of the addresses that are exposed for external reference. The index values correspond to a range of invalid addresses in the target architecture. The system also includes a second platform including one or more processors of a target architecture. The second platform is coupled to the first platform through a computer network. The system further includes a compilation module installed on the second platform adapted to execute on a processor of the target architecture, the compilation module adapted to receive the intermediate computer code and the index generated by the decompilation module, to compile the intermediate code into an executable program including machine code of the target architecture, and to incorporate the index into the executable program of the target architecture. The system additionally includes an interrupt handler installed on the second platform wherein, in response to detection by a processor of the second platform of the execution of an instruction to access an invalid address, the exception handler translates the invalid address into a valid address using the incorporated index. The system may further include a non-transitory computer readable medium as described above and may perform a method as described above.

BRIEF DESCRIPTION OF THE DRAWINGS

For a more complete understanding of embodiments of the present invention and its features and advantages, reference is now made to the following description, taken in conjunction with the accompanying drawings, in which:

FIG. 3 is a macro generated while performing a method according to FIG. 2 on a system according to FIG. 1;

FIG. 4 is another macro generated while performing a method according to FIG. 2 on a system according to FIG. 1;

FIG. 5 is still another macro generated while performing a method according to FIG. 2 on a system according to FIG. 1;

DETAILED DESCRIPTION

In accordance with one aspect of the invention, a load module decompiler is provided that is operable to receive as input, a relocatable load module previously compiled to run on a 32-bit mainframe computer, and to generate as output, an executable program compiled to run on a 64-bit computer. By selecting input executable programs that are not self-modifying and whose data and instructions can be separated because the operation of the compiler and its settings are known to separate data and instructions, it is possible to design a decompiler that will translate the input executable, program into a source format that may subsequently be compiled to run on a processor supporting a different instruction sets. Cobol load modules compiled using a Cobol compiler are an example of such programs. To preserve interoperability with other programs that externally reference addresses of the original program, a load module compiler generates an index of addresses that may potentially be referenced from outside the program, and generates as output object code that incorporates 32-bit index locations in lieu of 64-bit addresses for those addresses. In operation, the runtime environment provides an exception handler to translate 32-bit index locations into the correct 64-bit memory addresses for the indexed locations.

Figure 1:
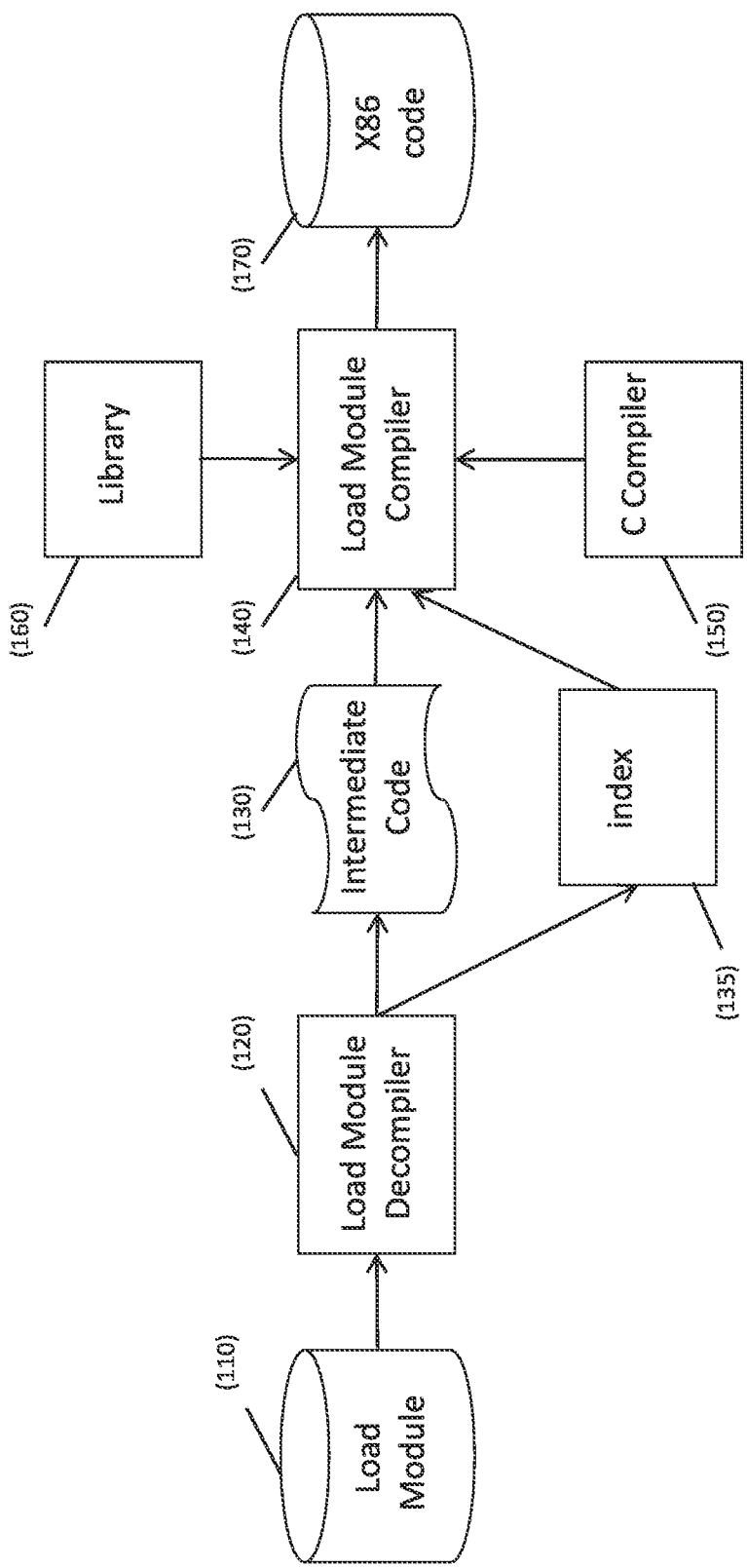
FIG. 1 is a schematic diagram of a system for executing a program compiled for a source architecture on a machine having a different target architecture.

In the example depicted in FIG. 1, a relocatable load module (110) includes a Cobol load module compiled to run on a System 390 or z/OS mainframe computer. In one embodiment, the Cobol load module is compiled to run on a processor supporting a 32-bit instruction set. The load module is first processed by a load module decompiler (120), which may be a mainframe resident facility that decompiles the load module into an intermediate code representation (130). The decompiler also constructs an index (135) of the symbols in the load module that may be externally referenced addresses. Alternatively, the load module may be exported to a non-mainframe platform, and the load module decompiler (120) may be implemented as an application running on that platform, and the load module could be exported to the non-mainframe platform for decompilation by the load module decompiler (120). In one embodiment, the intermediate code representation (130) generated by decompiling the load module is a file or set of files structured such that each instruction of the Cobol load module is represented by a macro in accordance with the rules of the C programming language. Other intermediate code representations (130) may be used. In one embodiment, the intermediate code representation (130) of the load module is received by a load module compiler (140) executing on an appliance, which may be an X86 platform that supports a 64-bit instruction set. A C compiler (150) is invoked by the load module compiler (140) to translate C macro instructions into 64-bit X86 instructions. The load module compiler (140) incorporates the index (135) into the output machine language program so that the external references to memory locations of the executable output program may be resolved. The load module compiler (140) may also invoke a library (150) of operating system functions to translate operating system function calls into native X86 instructions. The load module compiler (140) converts the intermediate code representation (13) into an X86 machine language program that is assembled into an executable file (170). Alternatively, in accordance with the invention, the load module compiler (140) could generate executable code for an alternative 64-bit machine.

In accordance with one embodiment, a decompilation module receives as input a relocatable object program for a first computer architecture and converts the object program into an intermediate representation. In one embodiment, the intermediate code representation constitutes a set of C programming language macros. In one embodiment, the decompilation module recognizes calls to system functions and identifies associated instructions that set up the parameters used by the system functions. In this example, a C program macro may be generated for each mainframe computer function or runtime library invocation. Alternatively, functions could be translated into function calls, but such an intermediate representation is more difficult to optimize. In another alternative, the intermediate code representation (130) could constitute a linear, three-address code format, which is an elementary representation of the program in which program statements are represented in basic blocks that are executed in sequence without branching. Therefore, the output of the load module decompiler (120) is an intermediate code representation (130) of the original relocatable object file.

A symbol table is a data structure that is often used by a compiler to store information about constructs found in a computer program. Typically, symbol tables contain a string identifier (lexeme) associated with each symbol, the type, storage address, and other information pertaining to the symbol. In a typical forward compiler, a symbol table is used in the analysis phase of the compiler to store information from declarations of program constructs. Symbol tables are also used by compilers in the synthesis phase to generate target code. In some cases, a single hash table may be used to contain the symbol table in a data structure that provides for constant time lookups of symbol information by the compiler. In the case of a 32-bit compiler, the compiler operates as if it has a 32-bit addressable memory space, and generates symbol addresses at offsets defined in that 32-bit address space. Similarly, in the case of a 64-bit compiler, the compiler operates as if it has a 64-bit addressable memory space, and generates symbol addresses at offsets defined in that 64-bit address space. Thus, if a program is compiled or recompiled using a 64-bit compiler, the object code output by the compiler will be machine code that uses 64-bit addresses.

In accordance with one aspect of the inventive system, in addition one or more symbol tables, the decompilation module (120) constructs an index of externally referenced program addresses. In particular, the index preferably includes externally referenced addresses, and addresses that are potentially externally referenced. In the case of a 32-bit relocatable load module, those program constructs that are recognized as addresses that may be externally referenced are stored in the index. Preferably, the index entries are assigned to a range of 32-bit numbers whose corresponding addresses in the 64-bit target address space are not allocated, such that the use of such 32-bit numbers as addresses invokes an exception handler. In one embodiment, the index is assigned to the lowest 16 k range of addresses in the 64-bit address space, ranging from 00 00 00 00 00 00 00 00h to 00 00 00 00 00 00 3F FFh. However, larger ranges of addresses, or addresses at a different offset that will be recognized as illegal addresses may also be used.

In one embodiment, a decompiler module (120) makes multiple passes through a an input load module to generate an index of all symbols that could be externally referenced 32 bit addresses. Upon subsequent compilation by a load module compiler module (140), this index of externally referenced addresses (or potentially externally referenced addresses), rather than a set of 64-bit addresses that would otherwise be assigned by the compiler, is combined into the recompiled program.

In one embodiment, the decompiler module (120) performs a first pass through the code of the relocatable Cobol load module during which it addresses control blocks, such as the Task Global Table (TGT) and Program Global Table (PGT), which contain information useful for navigating around the module. Additionally, the first pass of the decompiler module (120) operating in accordance with this embodiment establishes whether the program is reentrant or non-reentrant. If the program is reentrant, the decompiler module saves the address of the program's dynamic initialisation routine.

A set of Binder APIs is described in IBM publication MVS Program Management: Advanced Facilities, SA22-7744-14. These APIs can be used to obtain information regarding the structure and organization of the Cobol load module in accordance with one embodiment of the decompiler module (120). For example, the _iew_create_list API creates file and exit lists for use by the _iew_openW function. The _iew_openW function opens a Binder session and returns a context to identify the session that is used by other API calls. The _iew_setO API sets Binder options, such as acceptable return code levels. The _iew_get_reason_code API provides a reason code in the event of a non-zero return code from any other function call. The _iew_includeName API includes a load module or program object inot the Work Module for a Binder session. The _iew_loadW API loads the work module into main storage.

The _iew_bindW call binds the Work Module making it ready to be executed by relocating addresses and resolving external references. The _iew_getN API returns a count of CSECTs and a list of CSECT names within the Work Module. The _iew_getD API returns Returns data associated with each CSECT. Depending on usage, this may be the CSECT size, a list of Relocation Dictionary (RLD) entries, or a language entry which identifies the compiler which produced the CSECT. The _iew_getE API returns a list of External Symbol Dictionary (ESD) entries for each CSECT. The _iew_closeW API closes the Binder section. These Binder APIs can be used without changing the Work Module in any way. In accordance with one embodiment, the decompiler module invokes these Binder APIs to obtain information about the Cobol load module used to decompile the module.

If the code is not reentrant, the first pass of the decompiler module (120) then proceeds to examine forward branch addresses to build a list of labels and indexes. Branch instructions will typically be mapped to their branch relative equivalents in the decompiled code, and the branch targets will correspond to labels. However, when the input program code indicates that the address of an instruction is to be loaded into a general purpose register, the address is converted into an index entry. The PERFORM instruction is an example of an instruction generated by the Cobol compiler that loads such addresses into a general purpose register. Other instructions that load addresses into a general purpose register are also recognized by the decompiler module (120), and the corresponding addresses are converted into index entries.

In accordance with one embodiment, a second pass of the decompiler module (120) operates as an extension of the first pass, performing the same functions but with the benefit of the information necessary to process backward branches.

In one embodiment of the decompiler module (120), the third pass generates a copyright notice, a time stamp, and if the program is reentrant, it generates code for the dynamic initialization routine.

The third pass of the decompiler module (120) generates a copy of the intermediate code representation (130) of the input load module, so that addresses identified within the module as indexes can be altered as such. External Symbol Dictionary (ESD) entries are processed and added as external references where necessary. Because the relative addresses within the load module are relocated during the load process to virtual storage addresses, these addresses must be reset as relative addresses. Similarly, Relocation Dictionary (RLD) entries are processed; relocated relative addresses are un-relocated, and addresses which are identified as indexes are replaced by the corresponding index number. In one embodiment, all of the modified data and instructions in the output module are then inserted into a macro called MOD_DATA for subsequent processing by the load module compiler, as seen in FIG. 3.

Non-reentrant Cobol load modules include both the instructions and data within the load module. Reentrant Cobol programs include a dynamic initialization routine to permit data to be allocated at initialization, thus permitting multiple executions of the same load module to each have their own data.

If the program includes a dynamic initialization routine, the decompiler module assigns such routine to index value 1. The start of the program, which is identified by the unique label/index "start" is assigned index value 1 or 2, depending on the existence of the dynamic initialization routine. In one embodiment, RLD entries are then listed in another macro called MOD_RLD4 as illustrated in FIG. 4. The entries in this macro that have been replaced by indexes are listed as comments, as indicated by exemplary the entry /*0x00004C*/ as shown.

If the dynamic initialization routine exists, its name is specified in another macro. In one illustrative embodiment, this macro titled MOD_SUB. All remaining index entries, excluding that for the dynamic initialization routine, are then listed in a macro called MOD_LBL, as illustrated in FIG. 5. This enables the load module compiler to map index labels positioned in the code.

Pass three of the decompiler module continues on to generate the C macro code corresponding to the z/Architecture machine instructions. As mentioned previously, machine instructions are generally mapped one-to-one onto C macros in the intermediate code representation (130). Preferably, machine instructions that call external routines, such as Language Environment calls, COBOL runtime functions, or other user application modules are not mapped in this way. Instead, these external calls are replace by code to invoke native APIs. The intermediate code representation (130) together with the index (135).

In one embodiment, the load module compiler (140) includes a scripted set of macros that process the intermediate code representation (130) and index (135), including invoking the C compiler (150) and library (160) to generate x86 object code that is assembled into executable x86 code (170). A macro in the load module compiler (140) translates the list of index labels of FIG. 5 into an array of x86 address entries corresponding to each index label. This array of index values may be used at runtime, as described below, to translate external references made by other programs, into the correct x86 address in the compiled x86 code (170). In one embodiment, the first entry in the array corresponding to label zero is equated to an invalid address for purposes of error detection.

Figure 2:
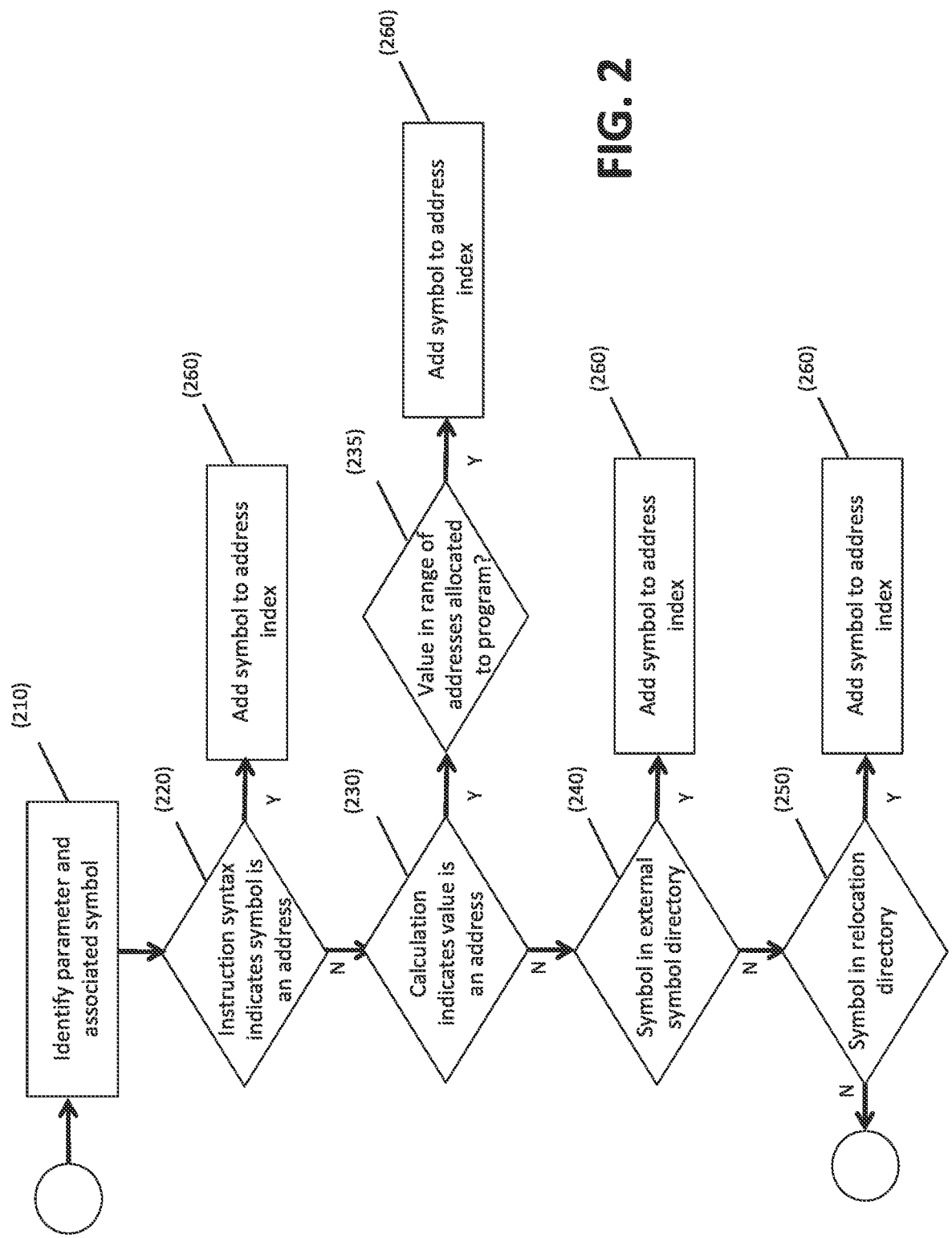
FIG. 2 is a flowchart of a method for executing a program compiled for a source architecture on a machine having a different target architecture.

The embodiment of the decompiler module described above may be further understood with reference to FIG. 2. FIG. 2 illustrates logically how the decompiler module (120), by making multiple passes through the code, identifies addresses that should be included in the index (135) rather than compiled to 64-bit addresses. In one pass through the code, the decompiler module (120) identifies each parameter and associated symbol (210), and performs a series of checks to determine whether the symbol should be added to the index. The decompiler module (120) examines the syntax of the instruction (220), and if the syntax of the instruction indicates that the symbol is an address, the address is added to the index (260). Next, the decompiler module examines symbol values that are calculated, and evaluates whether the manner of calculation of the parameter indicates that the symbol is an instruction address (230). For example, where a parameter is computed by adding an address offset to an integer value, such calculation indicates that the parameter is an address. Where the symbol is determined to be an instruction address, the decompiler module (120) evaluates whether the address falls within the range of addresses allocated to the program (235), and if the address is within this range, the symbol is added to the index (260). During the initial pass through the code, branch targets are identified so that branch targets to instruction addresses may also be added to the index on a subsequent pass.

In a third pass through the input load module, the decompiler module (120) determines whether the symbols are found in the external symbol directory (240). If found in the external symbol directory, the symbols are added to the index (260). Then, the decompiler module determines whether the remaining symbols are found in the relocation directory. If a symbol found in the relocation directory (250), then the decompiler module places (160) that symbol in the index (135). Symbols that are not placed in the index are decompiled.

The logical description of FIG. 2 is illustrative of how a decompiler module operating using the inventive concept may produce an index (135). Other sequencing of the steps to determine those addresses which are or could be externally referenced addresses could also be used.

After decompilation, the intermediate code representation (130) and index (135) are provided to a load module compiler module (140), which translates the intermediate code into x86 code (170), including not only translation of the C macro instructions of the intermediate code representation (130), but also calls to native APIs of the runtime environment written to optimize performance of certain external calls. Preferably, the APIs of the runtime environment are written to support invocation by x86 code (170) generated by the load module compiler, and by an emulator. In one embodiment, input load modules that are not suitable for decompilation by the decompiler module (120) are provided as input to the emulator to enable the legacy load module to run on the x86 platform, albeit with lower performance than in the case of decompilation by the decompiler module (120) and subsequent compilation by the load module compiler module (140).

When the compiler module (140) converts the intermediate code representation (130) into object code including x86 instructions that are assembled into an x86 executable program (170), the entries in the index (135) corresponding to the 32-bit addresses in the address index (135) are inserted into the object code generated by the compiler module (140) rather than inserting 64-bit addresses of the target architecture for those entries. The entries in the table are not given an absolute address, but are assigned an external reference which a linker may then assign to 64-bit addresses allocated to the compiled program. In one embodiment, index location zero is reserved as invalid, and the index of externally referenced addresses begins at location one.

Figure 6:
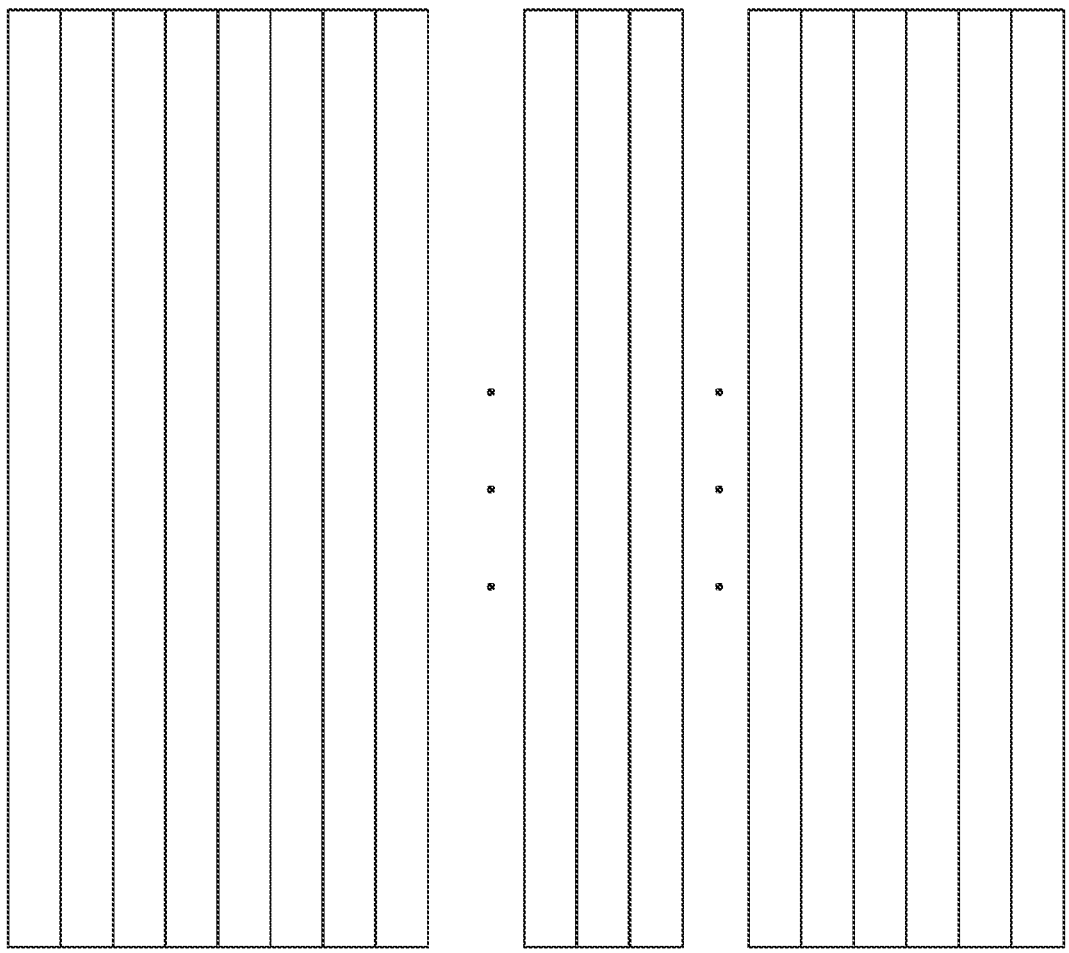
FIG. 6 is a schematic diagram of a 64-bit address space in a system according to FIG. 1, with the lowest portion of the address space corresponding to 32-bit numbers ranging from 0000 0001 0000 0000x down to 0000 0000 0000 0000x.

In operation, if the x86 executable program (170) refers to an indexed address, the runtime system uses the index to identify the 64-bit address of the corresponding instruction. However, a 32-bit program that has not been recompiled may still generate a 32-bit address. FIG. 6 depicts a 64-bit address space, with the lowest portion of the address space corresponding to 32-bit numbers ranging from 0000 0001 0000 0000x down to 0000 0000 0000 0000x. When a program attempts to execute an instruction at an address in this lowest portion of the address space, an exception is generated and an exception handler performs the necessary address translation as explained below.

An important function of the Memory Management Unit (MMU) is to prevent a process or task from executing instructions in memory that has not been allocated to that process or task. An attempt to execute instructions in memory that has not been allocated results in a hardware fault, which is intercepted by the operating system, often called a segmentation fault (SEGV), which causes generally termination of the process. In an embodiment implemented on an x86 machine running an instance of the Linux operating system, the MMU of the processor responds to an attempt to access instructions at these lowest addresses that have not been allocated to the user space of the program and causes the Linux operating system to generate a SEGV signal that invokes an exception handler. In one embodiment, the exception handler is configured to access the index of 32-bit addresses, and to translate the 32-bit address into the corresponding 64-bit address used by the executable program. The exception handler may also be configured to perform additional verifications, such as to support protection key management of memory addresses. One may use the exception handler and prefixing schemes described in PCT application PCT/IB2015/059646 titled "Protection Key Management and Prefixing in Virtual Address Space Application."

Figure 7:
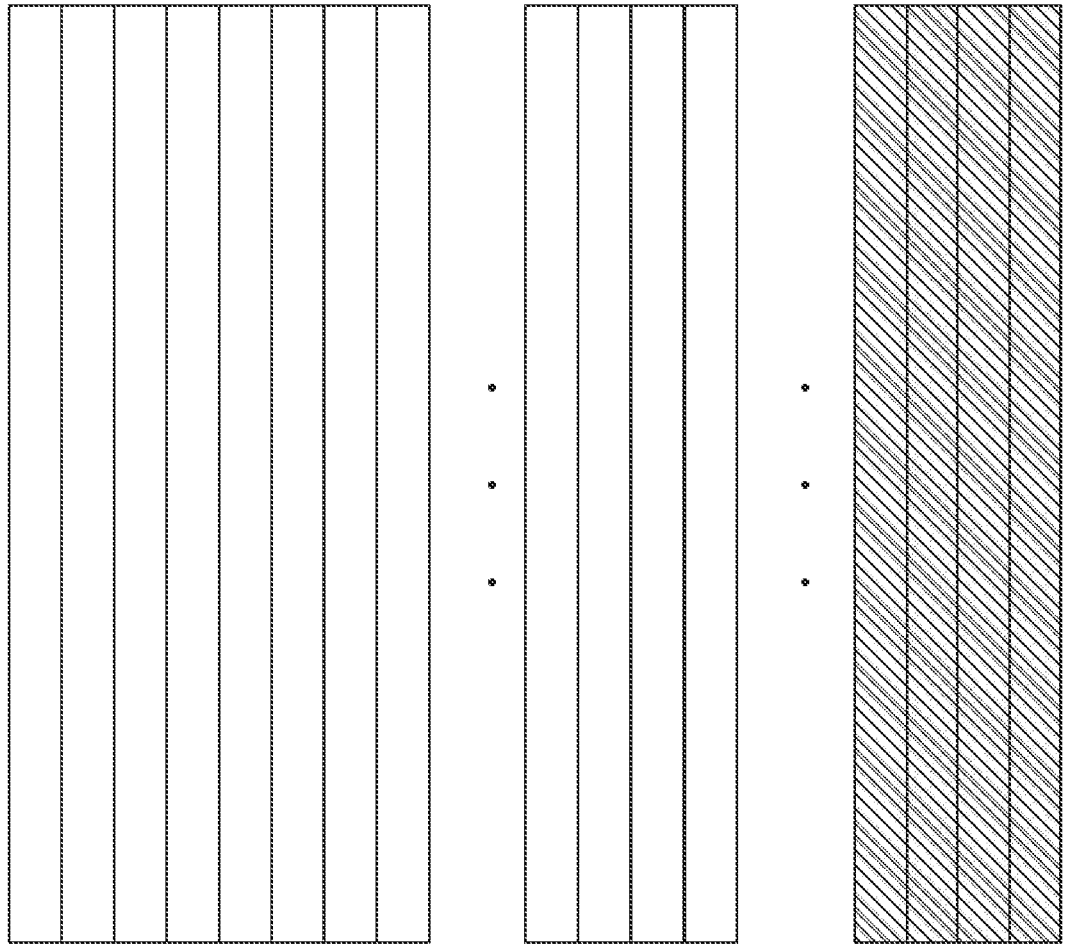
FIG. 7 is a schematic diagram of a bit space in a system according to FIG. 1 for which there are fewer than 16 k addresses that are potentially externally referenced, such that external memory references are to addresses ranging from 0000 0000 0000 0000x to 0000 0000 0000 3000x.

In one exemplary embodiment, for which there were fewer than 16 k addresses that were potentially externally referenced, the external memory references will be to addresses ranging from 0000 0000 0000 0000x to 0000 0000 0000 3000x, as depicted in FIG. 7. Because this range of addresses is not assigned to the program, an attempt to execute an instruction at these locations will invoke the MMU and exception handler, which will determine the correct address and then retry the instruction at the proper address.

In addition to the use of the exception handler, as a further optimization, the load module compiler (140) may insert into its output executable x86 code (170) instructions that recognize that an address is an invalid address, and to perform a lookup on the index to substitute a valid address for the x86 executable code. In this case, the index may have been embedded in the x86 executable code. This optimization can be used to avoid the overhead associated with context switching to invoke the exception handler each time an externally referenced address appears in the x86 executable code generated by the compiler module (140). In one embodiment, an input output macro is invoked for input output (10) instructions, and the load module compiler (140) inserts a compare instruction to determine whether the branch target of an input output routine is an invalid address corresponding to the invalid addresses used for the index. Additionally, the load module compiler inserts instructions to perform a lookup of the x86 address corresponding to the invalid address using the index. By way of this optimization, the overhead associated with invoking the exception handler is avoided for branch targets of input output routines. The load module compiler (140) could be adapted to perform a similar optimization for other frequently occurring instructions that invoke potentially externally referenced addresses. In one embodiment, the use of the of this optimization with the load module compiler produced nearly a six-fold increase in operating system performance for a COBOL job that ran using 358.512 seconds of CPU time without the optimization, and ran in 61.125 seconds using the optimization.

The load module compiler permits the execution of a natively x86 program derived from a legacy executable program or programs. In one example, the programs including the COBOL85 test suite of the National Institute of Standards and Technology "NIST" were initially compiled using the COBOL version 4 compiler to produce S390 executable code. After decompiling the compiled programs of the NIST test suite, to generate the intermediate file format and index, and after subsequently compiling the intermediate files into x86 program instructions using the compiler module, the x86 code generated by the compiler module produced identical program output when compared to the program output of the S390 executable code.

In another example, an executable load module compiled using the COBOL version 4 compiler was run on an emulator adapted to allow for the execution of the legacy program on an x86 computer. In this example, the emulator executed between 200 and 300 instructions on the emulator for each native instruction in the original executable program. When the executable load module was transformed using the decompiler module and compiler module described above into an x86 executable, the x86 executable file executed 8 to 9 instructions for each original native instruction. Due to the substantial reduction in the number of executable instructions required to execute the natively compiled program, significant performance gains can be achieved using the load module compiler of the present invention, particularly for processor bound workloads.

In another example, a load module executed using the load module compiler of the present invention achieved more than a ten-fold improvement in system performance when compared to execution of the same program on an emulator. In one example of a CPU-intensive COBOL program running on an IBM z10 model 2098-A02 rated for 6 MSU under z/OS 1.13, the program executed in 19 minutes 28 seconds of elapsed time, using 16 minutes of CPU time. In emulation, running the same COBOL program on a Dell PowerEdge R730xd, having 2 CPU sockets, 16 physical cores per socket, Intel® Xeon® CPU E5-2698 v3 at 2.3 GHz under Red Hat Enterprise Linux 7.1, the same COBOL program took three minutes and fifty-eight seconds elapsed and three minutes and fifty-nine seconds of total CPU time among the cores. Running the same COBOL program using the load module decompiler and load module compiler described herein, the program ran in exactly one minute using one minute of CPU time. Thus, in the example of this job, the load module compiler produced nearly a seventeen-fold performance increase over the legacy machine, and nearly a four-fold increase over the execution of the job in emulation.

The examples of the decompiler module (120) and the compiler module (140), the library (160), C compiler (150) and runtime environment including the interrupt handler may be stored in a non-transitory storage medium. The decompiler module (120) may be installed on a first platform, such as a legacy computer system, or may be installed on a different platform, which may be the exemplary x86 platform on which the compiler module (140), library (160), C compiler (150) and runtime environment are installed. Alternatively the various parts of the system may distributed on multiple platforms within the spirit of the invention described herein. Where more than one platform is used to install and operate the different parts of the inventive system, the different platforms are coupled by way of a computer network, which may include wired, optical, or wireless local area networks, wide area networks, satellite or other telecommunications networks. In operation, the system may be loaded from a non-volatile storage medium such as a disk, tape, hard drive, flash memory drive, or other non-volatile storage medium, such that portions or all of the components of the system are simultaneously resident in the volatile memory of the one or more computers that make up the system.

Many examples are provided herein. These examples may be modified without departing from the spirit of the present invention. The examples and embodiments described herein are offered as examples, and other components, routines, or modules may also be used.

The invention claimed is:

1. A computer implemented method for executing a first program compiled for a source architecture on a machine having a target architecture different from the source architecture, the method comprising:

receiving by a processor said first program comprising first executable code compiled to execute on a source architecture, the processor being of the source architecture or the target architecture;

decompiling a load module of the first program into intermediate computer code formatted according to an intermediate code format;

identifying a set of addresses that are exposed for external reference by a second program compiled to execute on the source architecture;

storing in a computer memory an index of said set of addresses that are exposed for external reference, wherein the index comprises values that correspond to invalid addresses in the target architecture;

recompiling the intermediate computer code into target executable code configured for the target architecture;

incorporating the index of said set of addresses into the target executable code; and executing said target executable code on a processor having said different target architecture, wherein said executing generates at least one invalid address and said invalid address is translated into a valid address using the incorporated index in the target executable code;

wherein the identifying the set of addresses that are exposed for external reference comprises, in a first pass, examining syntax of instructions in machine code of said first program, determining from the syntax of the instructions that a set of symbols are addresses, and adding the symbols to the index.

2. The method of claim 1, wherein the receiving by a processor said first program is performed by a first processor of said target architecture, and the recompiling is performed on a second processor of said target architecture.

3. The method of claim 1 wherein said intermediate computer code formatted according to an intermediate code format invokes an input output macro, further comprising:
inserting one or more instructions into the target executable code to determine that a branch target is directed to an invalid address; and
inserting instructions to replace such invalid address with a valid address at runtime using the incorporated index in the target executable code.

4. The method of claim 1 wherein the set of addresses that are exposed for external reference are 32-bit addresses and the at least one invalid address in the target architecture is a 64-bit address.

5. The method of claim 1 wherein said first program is a relocatable Cobol load module.

6. The method of claim 1 wherein the intermediate computer code formatted according to an intermediate code format comprises a set of C program macros.

7. The method of claim 1, wherein the identifying the set of addresses that are exposed for external reference further comprises identifying parameters in the machine code whose calculation indicates that the parameters are addresses within a range of addresses allocated to the first program, and adding symbols corresponding to each such parameter to the index.

8. The method of claim 7 wherein the identifying the set of addresses that are exposed for external reference further comprises identifying symbols located in an external symbol directory, and adding symbols corresponding to such identified symbols to the index.

9. The method of claim 8 wherein the identifying the set of addresses that are exposed for external reference further comprises identifying symbols located in a relocation directory, and adding symbols corresponding to such identified symbols to the index.

10. A non-transitory computer readable medium configured to store instructions, the instructions when executed by one or more processors cause the one or more processors to execute a first program compiled for a source architecture on a machine having a target architecture different from the source architecture by performing steps comprising:
receiving by a processor said first program comprising first executable code compiled to execute on a source architecture;
decompiling by a decompiler module executing on the processor a load module into intermediate computer code formatted according to an intermediate code format;
identifying by the decompiler module a set of addresses that are exposed for external reference by a second program compiled to execute on the source architecture;
storing in a computer memory an index of said addresses that are exposed for external reference, wherein the index comprises values that correspond to a range of invalid addresses in the target architecture, wherein the identifying by the decompiler includes:
in a first pass by the decompiler module, examining syntax of instructions in machine code of said first program;
determining from the syntax of the instructions that a set of symbols are addresses; and
adding the set of symbols to the index;
recompiling by a compiler module, the intermediate code into target executable code configured for the target architecture, wherein the compiler module incorporates the index of said addresses into the target executable code; and
executing said target executable code on a processor having said different target architecture, wherein said executing generates at least one invalid address and wherein an exception handler translates said invalid address into a valid address using the incorporated index.

11. The non-transitory computer readable medium of claim 10 wherein said intermediate code formatted according to an intermediate code format invokes an input output macro, and wherein the compiler module inserts one or more instructions into the target executable code to determine that a branch target is directed to an invalid address and instructions to replace such invalid address with a valid address at runtime using the incorporated index.

12. The non-transitory computer readable medium of claim 10 wherein the set of addresses that are exposed for external reference are 32-bit addresses and the at least one invalid address according to said target architecture is a 64-bit address.

13. The non-transitory computer readable medium of claim 10 wherein said first program is a relocatable Cobol load module.

14. The non-transitory computer readable medium of claim 10 wherein the intermediate code formatted according to an intermediate code format comprises a set of C program macros.

15. The non-transitory computer readable medium of claim 10, wherein the identifying by the decompiler module the set of addresses that are exposed for external reference further comprises identifying parameters in the machine code comprising said first program whose calculation indicates that the parameters are addresses within a range of addresses allocated to the first program, and adding symbols corresponding to each such parameter to the index.

16. The non-transitory computer readable medium of claim 15 wherein the identifying by the decompiler module the set of addresses that are exposed for external reference further comprises identifying symbols located in a relocation directory, and adding symbols corresponding to such identified symbols to the index.

17. A system for executing a first program compiled for a source architecture on a machine having a target architecture different from the source architecture, the system comprising:
- a first platform comprising one or more processors of a source architecture;
- a decompiler installed on the first platform and configured to execute on a processor of the one or more processors of said source architecture, the decompiler adapted to:
  - receive said first program comprising first executable code compiled to execute on a source architecture;
  - decompile a load module of the first program into intermediate computer code formatted according to an intermediate code format;
  - identify a set of addresses that are exposed for external reference by a second program compiled to execute on the source architecture, wherein identify includes:
    - in a first pass, examine syntax of instructions in machine code of said first program;
    - determine from the syntax of the instructions that a set of symbols are addresses;
    - add the set of symbols to an index of said set of addresses; and
  - store in a computer memory the index of said set of addresses that are exposed for external reference, wherein the index comprises values that correspond to invalid addresses in the target architecture;
- a second platform, comprising one or more processors of a target architecture, wherein the second platform is coupled to the first platform through a computer network;
- a compiler installed on the second platform adapted to execute on a processor of the target architecture, the compiler adapted to receive the intermediate computer code and the index generated by the decompiler, to compile the intermediate code into an executable program of the target architecture comprising machine code of the target architecture, and to incorporate the index of the set of addresses into the executable program of the target architecture; and
- an exception handler installed on the second platform wherein, in response to detection by a processor of the second platform of the execution of an instruction to access an invalid address, said exception handler translates said invalid address into a valid address using the incorporated index in the executable program of the target architecture.

* * * * *